US008140608B1

(12) United States Patent
Juffa

(10) Patent No.: US 8,140,608 B1
(45) Date of Patent: Mar. 20, 2012

(54) PIPELINED INTEGER DIVISION USING FLOATING-POINT RECIPROCAL

(75) Inventor: Norbert Juffa, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1328 days.

(21) Appl. No.: 11/756,188

(22) Filed: May 31, 2007

(51) Int. Cl.
  *G06F 7/52* (2006.01)
(52) U.S. Cl. ...................................... 708/650
(58) Field of Classification Search .......... 708/650–656, 708/504
  See application file for complete search history.

(56) References Cited

U.S. PATENT DOCUMENTS

| | | | | |
|---|---|---|---|---|
| 4,722,069 | A | * | 1/1988 | Ikeda ............................ 708/656 |
| 4,797,849 | A | * | 1/1989 | Nakano ......................... 708/654 |
| 4,878,190 | A | | 10/1989 | Darley et al. |
| 5,065,352 | A | * | 11/1991 | Nakano ......................... 708/654 |
| 5,249,149 | A | | 9/1993 | Cocanougher et al. |
| 5,309,383 | A | * | 5/1994 | Kuroiwa ....................... 708/504 |
| 5,737,255 | A | | 4/1998 | Schwarz |
| 6,094,669 | A | * | 7/2000 | Mahurin ........................ 708/655 |
| 6,598,065 | B1 | | 7/2003 | Harrison |
| 2002/0016808 | A1 | | 2/2002 | Pelton et al. |
| 2004/0117423 | A1 | | 6/2004 | Shi et al. |
| 2005/0289209 | A1 | | 12/2005 | Robison |
| 2006/0064454 | A1 | | 3/2006 | Wang et al. |

FOREIGN PATENT DOCUMENTS

| | | |
|---|---|---|
| WO | WO 2008/127610 | 10/2008 |
| WO | WO 2008/127622 | 10/2008 |
| WO | WO 2008/127623 | 10/2008 |

OTHER PUBLICATIONS

Eggers, et al. "Simultaneous Multithreading: A Platform for Next-Generation Processors," *IEEE Micro*, vol. 17, No. 5, pp. 12-19, Sep./Oct. 1997.
Non-Final Office Action, U.S. Appl. No. 12/030,178, dated Mar. 16, 2011.
Alverson, Robert, "Integer Division Using Reciprocals", Proceedings of the 10th IEEE Symposium on Computer Arithmetic, 1991, pp. 61-72.
Robison, Arch D., "N-Bit Unsigned Division Via N-Bit Multiply-Add", Proceedings of the 17th IEEE Symposium on Computer Arithmetic (ARITH'05), 2005, pp. 131-139.
Oberman, et al. "Design Issues in Division and Other Floating-Point Operations," IEEE Transaction on Computers, vol. 46, No. 2, Feb. 1997, pp. 154-161.
Oberman, Stuart F. "Floating Point Division and Square Root Algorithms and Implementation in the AMD-K7 Microprocessor," Proceedings of the 14th IEEE Symposium on Computer Arithmetic, Apr. 1999, pp. 106-115.
AMD, Software Optimization Guide for AMD64 Processors, Sep. 2005, available at www.amd.com/us-en/assets/content_type/white_papers_and_tech_docs/25112.PDF.

* cited by examiner

*Primary Examiner* — Tan V Mai
(74) *Attorney, Agent, or Firm* — Patterson & Sheridan, LLP

(57) ABSTRACT

One embodiment of the present invention sets forth a technique for performing fast integer division using commonly available arithmetic operations. The technique may be implemented in a two-stage process using a single-precision floating point reciprocal in conjunction with integer addition and multiplication. Furthermore, the technique may be fully pipelined on many conventional processors for performance that is comparable to the best available high-performance alternatives.

20 Claims, 5 Drawing Sheets

PIPELINED INTEGER DIVISION USING FLOATING-POINT RECIPROCAL

BACKGROUND OF THE INVENTION

1. Field of the Invention

Embodiments of the present invention relate generally to computer arithmetic and more specifically to pipelined integer division using floating-point reciprocal.

2. Description of the Related Art

A typical computer system uses at least one central processing unit (CPU) to execute programming instructions associated with the specified function of the computer system. The programming instructions include, without limitation, data storage, data retrieval, branching, looping, and arithmetic operations. In order to optimize program execution performance, many conventional CPUs incorporate dedicated hardware resources that can efficiently perform frequently encountered arithmetic operations, such as integer addition (subtraction) and multiplication, which have an important impact on overall performance. Integer division, however, is used infrequently enough that most processor designers choose to avoid the expense of dedicated hardware resources. In such cases, integer division is typically provided by a performance optimized software implementation.

Certain advanced computer systems augment the processing capability of a general purpose CPU with a specialty processor, such as a graphics processing unit (GPU). Each GPU may incorporate one or more processing units, with higher performance CPUs having 16 or more processing units. GPUs and CPUs are generally designed using similar architectural principles, including a careful allocation of hardware resources to maximize performance while minimizing cost. Furthermore, the arithmetic operations typically selected for execution on dedicated GPU hardware resources tend to mirror the arithmetic operations executed on dedicated CPU hardware resources. Thus, similar to many CPUs, integer division, which is less frequently used in GPU applications, is typically implemented in software for execution on the GPU.

When performing software-based integer division operations, the operations may be performed by software executing integer instructions or a combination of integer and floating-point instructions. For example, the classical shift-and-subtract algorithm using integer machine instructions typically computes no more than one result bit per step, where each step typically includes one to three machine instructions, depending on machine architecture. One solution to improve integer division performance uses one floating-point reciprocal (1/x) function to implement integer division, provided the bit-width of the floating-point mantissa is larger than the bit-width of the integer being processed. However, the standard single-precision floating-point mantissa is only 24-bits, whereas the bit-width of an integer value is typically 32-bits, precluding the use of this approach on most common processors. Another class of solution uses specialty arithmetic operations, such as a floating-point fused-multiply-add (FMA), to facilitate integer division. However, these arithmetic operations are typically not supported by the dedicated hardware resources found on conventional processors, such as commonly available CPUs and GPUs, thereby restricting the usefulness of this class of solution.

As the foregoing illustrates, what is needed in the art is a technique for performing integer division operations in software that uses the hardware resources available on conventional processors more efficiently than prior art approaches.

SUMMARY OF THE INVENTION

One embodiment of the present invention sets forth a method for performing integer division. The method includes the steps of receiving an integer dividend and an integer divisor, computing a first partial quotient using a set of significant bits from the dividend, computing a first partial remainder, adjusting the first partial quotient to generate an adjusted first partial quotient, computing a second partial quotient based on the first partial remainder, computing a second partial remainder, adjusting the second partial quotient to generate an adjusted second partial quotient, and computing a quotient by adding the adjusted first partial quotient to the adjusted second partial quotient.

One advantage of the disclosed method is that it enables integer division to be performed on conventional single-precision floating-point hardware more effectively relative to prior art techniques.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
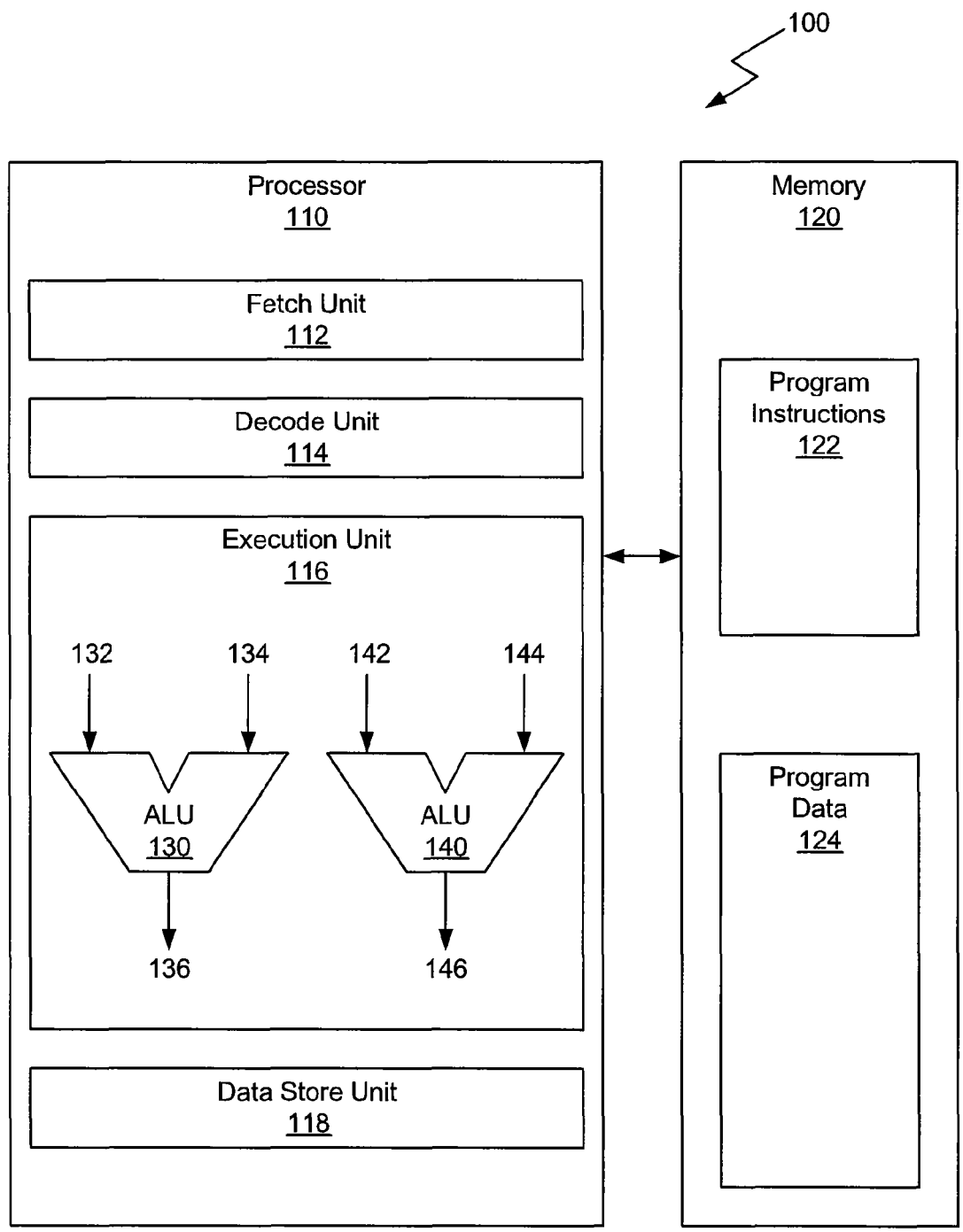
FIG. 1 is a conceptual diagram of a system in which one or more aspects of the invention may be implemented.

FIG. 1 is a conceptual diagram of a system 100 in which one or more aspects of the invention may be implemented. The system 100 includes a processor 110, which may be any type of conventional CPU, GPU or similar processing device, coupled to a memory 120. The processor 110, which may be any type of conventional CPU, GPU or similar processing device, includes a fetch unit 112, a decode unit 114, an execution unit 116 and a data store unit 118. The memory 120 stores information related to the operation of the processor 110, including, without limitation, program instructions 122 and program data 124.

The fetch unit 112 retrieves a sequential instruction stream for processing from the program instructions 122 stored in memory 120. Certain operations within the instruction stream require additional data, which may be retrieved by the fetch unit 112 from the program data 124 within the memory 120.

The decode unit 114 directs specific actions that should be performed by the logic within the processor 110 in order to execute a decoded instruction. For example, the decode unit 114 may configure the execution unit 116 to perform an integer multiply upon decoding an integer multiply instruction from the instruction stream.

The execution unit 116 performs the operations associated with decoded instructions using dedicated hardware resources, including, without limitation, at least one arithmetic-logic unit (ALU). Conventional processors typically incorporate independent ALUs for processing related types of data. For example, execution unit 116 within processor 110 includes ALU 130 for processing integer operations and ALU 140 for processing floating-point operations. When the execution unit 116 performs an integer multiply, a multiplicand and a multiplier are presented to inputs 132 and 134 of ALU 130. The resulting product is emitted from output 136 of ALU 130 for further processing. Similarly, when the execution unit 116 performs a floating-point division, a dividend and divisor are presented to inputs 142 and 144 of ALU 140. The ALU 140 computes a quotient, and emits the quotient via output 146.

The output 136 of ALU 130 and the output 146 of ALU 140 may be stored within the processor 110 or stored in the program data 124. The data store unit 118 performs the necessary actions to store ALU outputs 130 and 140 in the program data 124 within memory 120 for later use.

Figure 2:
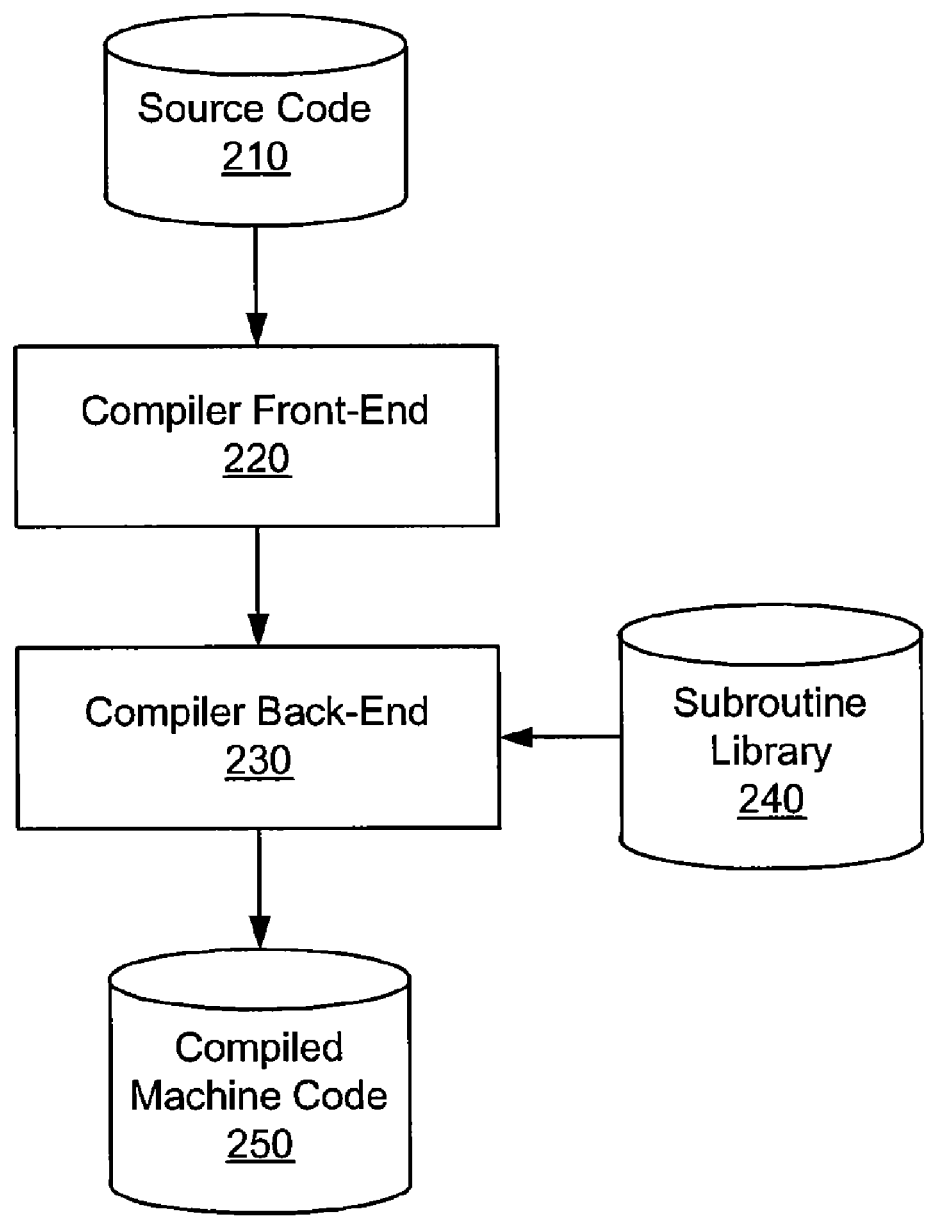
FIG. 2 is a conceptual illustration of source code to machine code compilation, according to one embodiment of the invention.

FIG. 2 is a conceptual illustration of source code 210 to machine code 250 compilation, according to one embodiment of the invention. As shown, source code 210, which may be written in a high-level language such as "C," is processed by a compiler front-end 220. The compiler front-end 220 translates the source code 210 into an intermediate code representation of the source code 210. The intermediate code represents the translated operations of source code 210 in terms of generic operations that tend to be independent of the specific instruction set of the target processor. In fact, the intermediate code may invoke operations that are not directly supported by the target processor. For example, if source code 210 specifies an integer division operation in the flow of programming instructions, then that same division operation may be reproduced as an integer division operation in the more generic operations of the intermediate code. While integer division operations may be supported by some processors, these operations may not be supported by many conventional processors. For processors that do not directly support integer division, these operations may instead be implemented within a subroutine library 240 and called or instantiated within compiled machine code 250.

A compiler back-end 230 receives the intermediate code and generates machine code that is specific to the target processor. In some embodiments, code from the subroutine library 240 is incorporated into the compiled machine code 250 by the compiler back-end 230. The functions within the subroutine library 240 may then be invoked as needed with a function call. Alternately, selected functions within the subroutine library 240 maybe included "in-line" in the compiled machine code 250, thereby eliminating the overhead of a function call, but increasing the size of the resulting compiled machine code 250.

The compiled machine code 250 may be stored in the memory 120 of FIG. 1 as all or part of the program instructions 122. As described below in FIG. 3, the compiled machine code 250 included in the program instructions 122 may be used by the processor 110 to perform integer division operations where the processor 110 does not include hardware elements dedicated for such operations.

Figure 3:
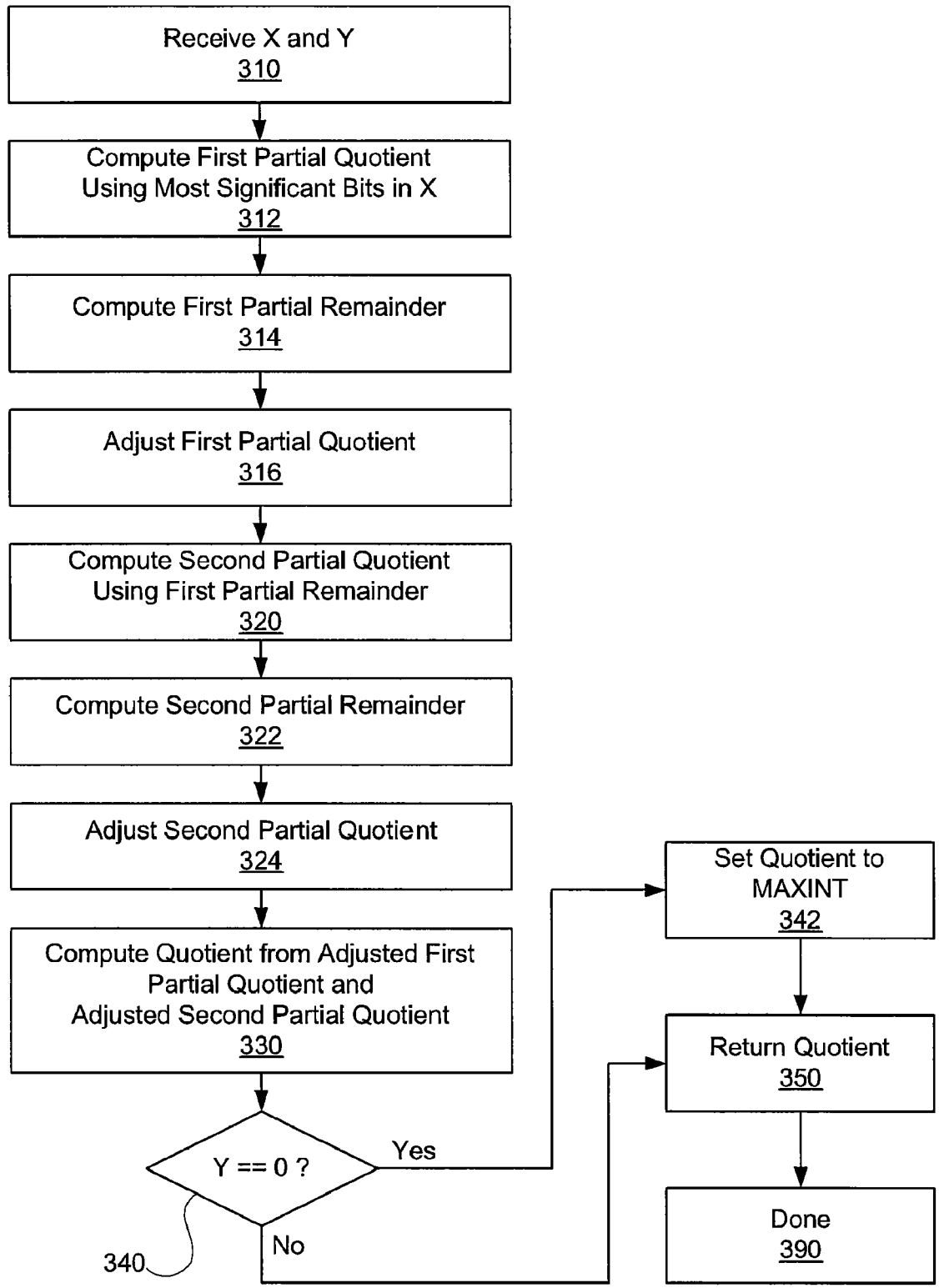
FIG. 3 is a flow diagram of method steps for computing a pipelined unsigned integer division using a floating-point reciprocal operation, according to one embodiment of the invention.

FIG. 3 is a flow diagram of method steps for computing a pipelined unsigned integer division using a floating-point reciprocal operation, according to one embodiment of the invention. Although the method steps are described in conjunction with the systems of FIGS. 1, 2, 4 and 5, persons skilled in the art will understand that any system that performs the method steps, in any order, is within the scope of the invention. Furthermore, techniques for performing operations related to unsigned division, such as signed division and integer modulo, may be implemented using the method taught herein in conjunction with wrapper techniques that are well-known in the art.

The method begins in step 310, where the processor 110 receives two integer values, X and Y for processing. These two integer values may be read from internal storage, such as a register file or the program data 124 stored in memory 120. The variable X contains the value of the dividend, and the variable Y contains the value of the divisor, of a division operation.

In step 312, the processor 110 computes a first partial quotient using the most significant bits in X. The process of computing the first partial quotient is illustrated in the pseudo-code shown below in TABLE 1. Again, X is dividend and Y is the divisor. As a convention, variables beginning with "f," such as fx2 and fy2, contain floating-point values, while the remaining variables contain unsigned integers. The function uint2float_rz ( ) receives an unsigned integer as input and returns a floating point value, where the result is rounded to zero, as indicated by the "_rz" suffix in the function name. In other words, the least significant bits of the unsigned integer are truncated to fit the mantissa bits of the floating-point return value, thereby avoiding any rounding in the format conversion. By contrast, the function uint2float_rn ( ) performs standard IEEE-754 format conversion, which includes standard "round to nearest even" techniques, as indicated by the "_rn" suffix in the function name. The rcp ( ) function returns a floating-point reciprocal of a floating-point input value. The rcp ( ) function has three important characteristics. First, the error in the return value from rcp ( ) is strictly less than 1 unit of least precision (ULP) compared to an ideal mathematical result. Second, the return value of rcp ( ) may be either greater than or less than the ideal mathematical result (by less than 1 ULP). Third, the return value of rcp ( ) should be a monotonic function of the input. The fmul_rz ( ) function returns a floating-point product of two floating-point inputs, where the product is rounded to zero, as indicated by the "_rz" suffix in the function name. The float2uint ( ) function returns an unsigned integer output from a floating-point input.

TABLE 1

```
x1 = X >> 8;
fx2 = uint2float_rz (x1);
fy1 = uint2float_rn (Y);
fy2 = rcp (fy1);
fq3 = fmul_rz (fx2, fy2);
q4 = float2uint_rz (fq3);
```

In step 314, the processor 110 computes the first partial remainder. The process of computing the first partial remainder is illustrated in the pseudo-code set forth below in TABLE 2. As shown, x5 is the product of q4, a first partial quotient and Y, divisor. If x5 is larger than x1 (the most significant twenty-four bits of the dividend), then an overrun correction is performed by subtracting Y from x1. The resulting value is then subtracted from x1 and shifted up eight bit positions to align x8 to X. A bitwise OR is applied between x8 and the lower eight bits of X to yield the first partial remainder, x9.

TABLE 2

| | |
|---|---|
| x5 = q4 * Y; | // q4 from TABLE 1 |
| x6 = (x5 > x1) ? x5 – Y : x5 ; | // x1 from TABLE 1 |
| x7 = x1 – x6; | |
| x8 = x7 << 8; | |
| xlo = X & 0xFF; | |
| x9 = x8 \| xlo; | |

In step 316, the processor 110 adjusts the first partial quotient to account for any overrun in the first partial quotient, as illustrated by the pseudo-code shown in TABLE 3. An overrun condition is corrected using a conditional assignment for q6. The value of q6 is shifted eight bit positions to the left to produce the adjusted first partial quotient q7. As described, this value has been adjusted for overrun and has been aligned to the proper position for computing the final quotient.

TABLE 3

| | |
|---|---|
| q6 = (x5 > x1) ? q4 – 1 : q4; | // x1, q4 from TABLE 1; x5 from TABLE 2 |
| q7 = q6 << 8; | |

In step 320, the processor 110 computes a second partial quotient using the first partial remainder, as illustrated by the pseudo-code shown in TABLE 4. The resulting value q12 is the second partial quotient. Note that this value may need to be adjusted for overrun or under-run in subsequent steps.

TABLE 4

| | |
|---|---|
| fx10 = uint2float_rz(x9); | // x9 from TABLE 2 |
| fq11 = fmul_rz(fx10, fy2); | // fy2 from TABLE 1 |
| q12 = float2uint_rz (fq11); | |

In step 322, the processor 110 computes a second partial remainder. This process is illustrated in the pseudo-code set forth in TABLE 5. The second partial remainder is computed by first multiplying q12 (the second partial quotient, prior to overrun adjustment) by Y to yield x13, which is then compared to x9 (the first partial remainder). If an overrun in x13 is detected (if x13>x9), then the result is adjusted by subtracting Y from x13. The resulting second partial remainder, x15, is then generated by subtracting x14 from x9.

TABLE 5

| | |
|---|---|
| x13 = q12 * Y; | // q12 from TABLE 4 |
| x14 = (x13 > x9) ? x13 – Y : x13; | // x9 from TABLE 2 |
| x15 = x9 – x14; | |

In step 324, the processor 110 adjusts the second partial quotient, as illustrated in the pseudo-code set forth in TABLE 6. As shown, two adjustments are made to the second partial quotient q12 to yield the adjusted second partial quotient q16.

TABLE 6

| | |
|---|---|
| q14 = (x13>x9) ? q12 –1 : q12; | // x13, x9, q12 from TABLES 5, 2, 4 |
| q16 = (x15 >= Y) ? q14 + 1 : q14; | // x15 from TABLE 5 |

In step 330, the processor 110 computes a quotient from the adjusted first partial quotient and the adjusted second partial quotient. Specifically, the two adjusted partial quotients, q7 and q16, are added together to produce q17, a candidate for the final quotient.

TABLE 7

| | |
|---|---|
| q17 = q7 + q16; | // q7 from TABLE 3, q16 from TABLE 6 |

In step 340, the processor 110 compares the divisor to zero (0). In step 340, if the divisor (Y) is found to be zero, then a maximum integer value (MAXINT) is returned as the quotient value. This condition corresponds to a divide by zero.

Otherwise, in step 340, if the divisor (Y) is found to be non-zero, then the value q17 is returned as the quotient value. Steps 340, 342 and 350 may be implemented as reflected in pseudo-code illustrated in TABLE 8. The method terminates in step 390.

TABLE 8

| | |
|---|---|
| quot = (Y == 0) ? ~Y : q17; | // q17 from TABLE 7 |

The method of FIG. 3 advantageously allows integer division to be performed effectively on conventional single-precision floating-point hardware. More specifically, as is well-known, applications that use floating-point arithmetic tend to rely on a mix of operations, including addition (subtraction), multiplication and division in order to achieve good overall performance. In fact, the availability of high-performance floating-point division tends to be an important requirement to the overall performance of many floating-point applications. The bit-width of each floating-point variable in many conventional 32-bit CPU architectures (and GPUs with internal 32-bit architectures) is limited to standard "single-precision" 32-bit values, specified in the IEEE 754 specification. A standard 32-bit single-precision floating-point number includes twenty-four bits of mantissa (twenty-three bits are represented, with a leading implied "1" value), eight bits of exponent and a sign bit. Thus, persons skilled in the art will readily recognize the compatibility of the disclosed algorithm with such conventional hardware designs.

Persons skilled in the art will also recognize that the disclosed integer division technique may be realized in many different implementations on many different processing platforms without deviating from the scope of the present invention. For example, the integer division technique may be implemented on a graphics processing unit (GPU) configured to execute multiple threads in multiple streaming multiprocessor cores, as discussed in greater detail below.

Figure 4:
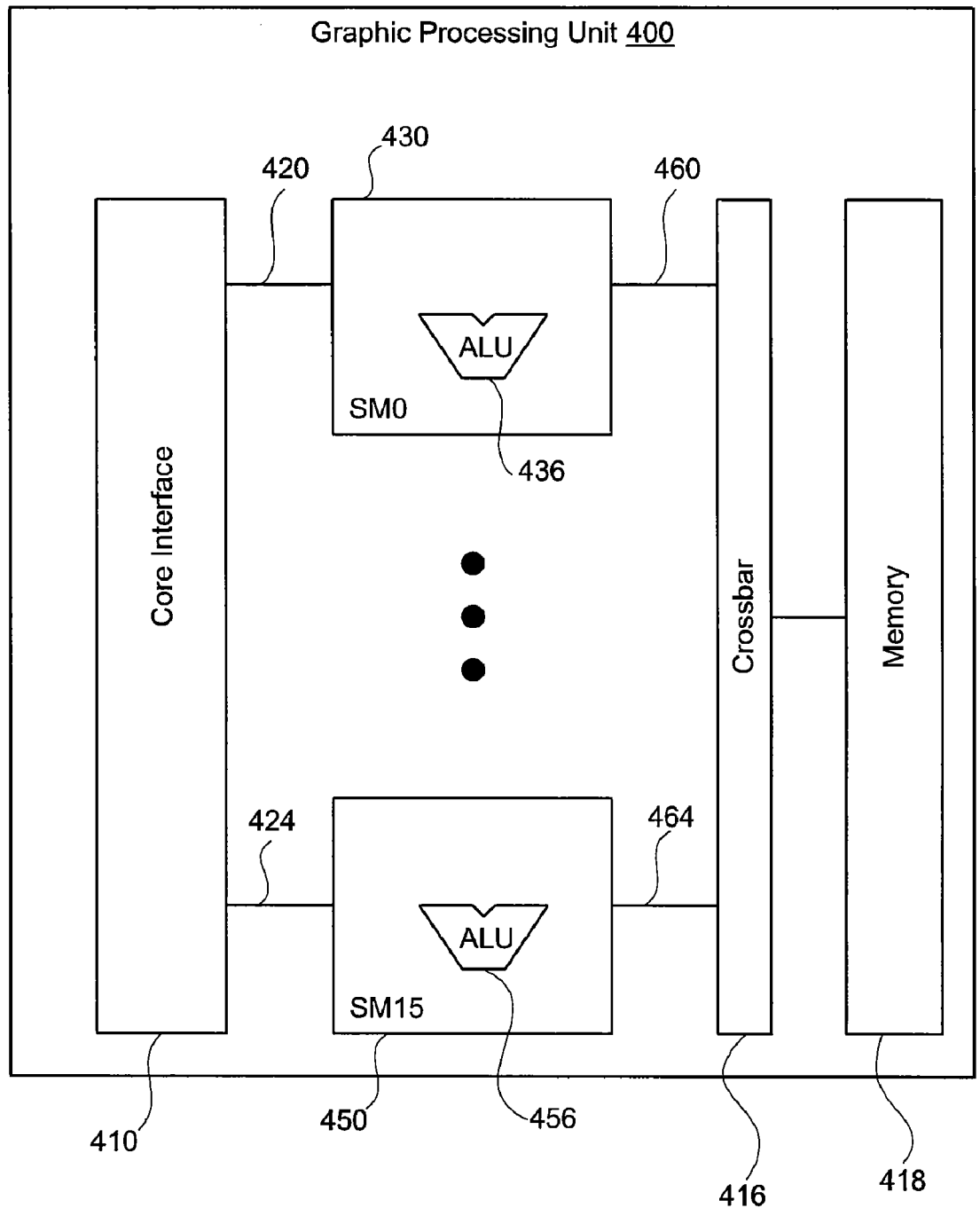
FIG. 4 is a conceptual diagram of a graphics processing unit in which one or more aspects of the invention may be implemented.

FIG. 4 is a conceptual diagram of a graphics processing unit (GPU) 400 in which one or more aspects of the invention may be implemented. As shown, the GPU 400 includes a memory 418 and a plurality of streaming multiprocessors, shown as "SM0" 430 and "SM15" 450. Each streaming multiprocessor is a single-instruction, multiple-data ("SIMD") multiprocessor that may execute instructions independently of the other streaming multiprocessors within the GPU 400. In addition, each streaming multiprocessor executes a single instruction on different data across a plurality of streaming processors (not shown) included within that streaming multiprocessor. The series of instructions to a single streaming processor within a streaming multiprocessor is referred to as a "thread," and the collection of concurrently executing threads among the streaming processors within the streaming multiprocessor is referred to as a "thread group."

The instructions executed by a streaming multiprocessor may be an arithmetic, logical and/or memory operation, including read and write operations to the memory 418. Arithmetic and logic operations are performed by ALUs 436 and 546. Each ALU 436, 546 includes logic to perform integer operations and floating-point operations, including, without limitation, integer addition and multiplication, as well as floating-point division. The threads executing on a particular streaming multiprocessor may be configured to execute the method steps of FIG. 3 in order to perform integer division with greater efficiency.

The GPU 400 also includes a core interface 410 that couples the GPU 400 to external memory resources. The core interface 410 is also coupled to the streaming multiprocessors 430 and 450 through a plurality of couplings, shown as interfaces 420 and 424, respectively. The streaming multiprocessors 430 and 450 are coupled to the memory 418 through a crossbar 416, which is advantageously designed to allow any streaming multiprocessor to access any memory location within the memory 418. The streaming multiprocessors 430, 440 and 450 access the memory 418 through couplings 460 and 464, respectively, and through a coupling between the crossbar 416 and the memory 418 (not shown). The couplings 460 and 464 may allow wide data transfers (e.g., 256 bits or more) between the memory 418 and the streaming multiprocessors of the GPU 400.

Figure 5:
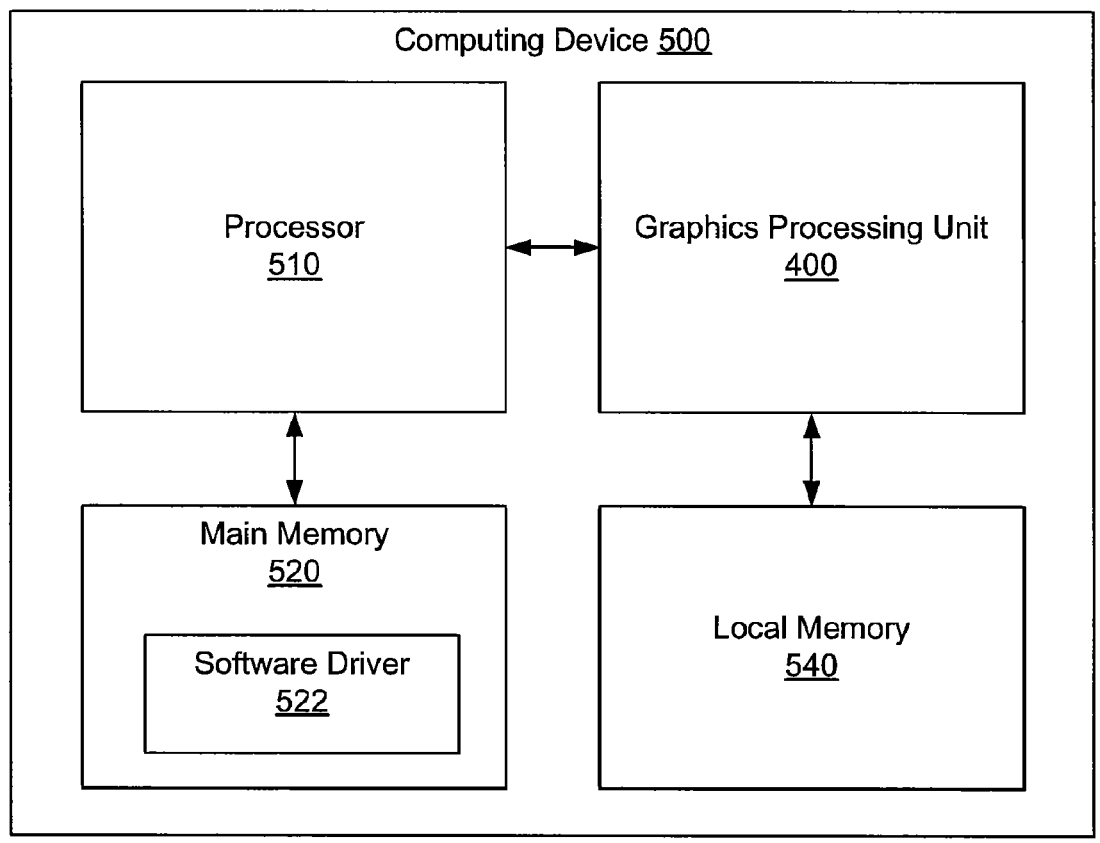
FIG. 5 is a conceptual diagram of a computing device that includes the graphics processing unit of FIG. 4 and is configured to implement one or more aspects of the invention.

FIG. 5 is a conceptual diagram of the computing device 500 that includes the graphics processing unit 400 of FIG. 4 and is configured to implement one or more aspects of the invention. As shown, the computing device 500 includes a processor 510, a main memory 520, a graphics processing unit 400 of FIG. 4 and a local memory 540. The main memory 520 includes a software driver program 522, used to configure and manage the graphics processing unit 400. The main memory 520 is coupled to the processor 510. The local memory 540 is coupled to the graphics processing unit 400, providing a high-bandwidth memory resource. In some embodiments, the main memory 520 may be accessed by the graphics processing unit 400 via the processor 510. In further embodiments, the local memory 540 may be accessed by the processor 510 via the graphics processing unit 400. In various embodiments, either the graphics processing unit 400 or the processor 510, or both, may be configured to implement the integer division algorithm described in conjunction with the method of FIG. 3. The computing device 500 may be a desktop computer, server, laptop computer, palm-sized computer, personal digital assistant, tablet computer, game console, cellular telephone, or any other type of similar device that processes information.

In sum, a high-performance technique for computing integer division using commonly available instructions, such as a floating-point reciprocal, is disclosed. The technique computes one floating-point reciprocal from which two partial quotients are generated. The two partial quotients are combined to form the final, full-precision integer quotient. In one embodiment, a single-precision floating-point reciprocal operation is used in conjunction with integer addition and multiplication operations to implement single-precision integer division. The technique may be fully pipelined by using predicated execution instructions (where computation decisions are required), thus enabling this technique to be fully-pipelined for higher performance.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the scope of the present invention is determined by the claims that follow.

I claim:

1. A method for performing integer division, the method comprising:
   receiving an integer dividend and an integer divisor;
   computing, via one or more processors, a first partial quotient using a set of significant bits from the dividend;
   computing a first partial remainder;
   adjusting the first partial quotient to generate an adjusted first partial quotient;
   computing a second partial quotient based on the first partial remainder;
   computing a second partial remainder;
   adjusting the second partial quotient to generate an adjusted second partial quotient; and
   computing a quotient by adding the adjusted first partial quotient to the adjusted second partial quotient.

2. The method of claim 1, further comprising the step of testing for a divide by zero condition.

3. The method of claim 2, further comprising the steps of modifying the quotient if a divide by zero is detected and returning the modified quotient.

4. The method of claim 1, wherein the first partial quotient is within one unit of least precision of the adjusted first partial quotient.

5. The method of claim 1, wherein the step of computing the adjusted first partial quotient includes determining that the first partial quotient includes an overrun and decrementing the first partial quotient by an integer value of one.

6. The method of claim 1, wherein the step of computing the adjusted first partial quotient includes shifting the bits associated with the first partial remainder to align with the bits associated with the integer divisor.

7. The method of claim 1, wherein the step of computing the second partial quotient includes multiplying the first partial remainder by the reciprocal of the integer divisor.

8. The method of claim 1, wherein the step of computing the adjusted second partial quotient includes determining that the second partial quotient includes an overrun and decrementing the second partial quotient by an integer value of one.

9. The method of claim 1, wherein the step of computing the adjusted second partial quotient includes determining that the second partial remainder is larger than the integer divisor and incrementing the second partial quotient by an integer value of one.

10. A non-transitory computer-readable medium that includes a set of instructions that when executed by a processor causes a computing device to perform an integer division operation, by performing the steps of:
    receiving an integer dividend and an integer divisor;
    computing a first partial quotient using a set of significant bits from the dividend;
    computing a first partial remainder;

adjusting the first partial quotient to generate an adjusted first partial quotient;

computing a second partial quotient based on the first partial remainder;

computing a second partial remainder;

adjusting the second partial quotient to generate an adjusted second partial quotient; and computing a quotient by adding the adjusted first partial quotient to the adjusted second partial quotient.

11. The computer-readable medium of claim 10, further comprising the step of testing for a divide by zero condition.

12. The computer-readable medium of claim 11, further comprising the steps of modifying the quotient if a divide by zero is detected and returning the modified quotient.

13. The computer-readable medium of claim 10, wherein the first partial quotient is within one unit of least precision of the adjusted first partial quotient.

14. The computer-readable medium of claim 10, wherein the step of computing the adjusted first partial quotient includes determining that the first partial quotient includes an overrun and decrementing the first partial quotient by an integer value of one.

15. The computer-readable medium of claim 10, wherein the step of computing the adjusted first partial quotient includes shifting the bits associated with the first partial remainder to align with the bits associated with the integer divisor.

16. The computer-readable medium of claim 10, wherein the step of computing the second partial quotient includes multiplying the first partial remainder by the reciprocal of the integer divisor.

17. The computer-readable medium of claim 10, wherein the step of computing the adjusted second partial quotient includes determining that the second partial quotient includes an overrun and decrementing the second partial quotient by an integer value of one.

18. The computer-readable medium of claim 10, wherein the step of computing the adjusted second partial quotient includes determining that the second partial remainder is larger than the integer divisor and incrementing the second partial quotient by an integer value of one.

19. A computing device configured to perform an integer division operation, the system comprising:

a memory configured to store program instructions and program data; and a processing unit configured to execute the program instructions, causing the processing unit to perform the steps of:

receiving an integer dividend and an integer divisor, computing a first partial quotient using a set of significant bits from the dividend, computing a first partial remainder, adjusting the first partial quotient to generate an adjusted first partial quotient, computing a second partial quotient based on the first partial remainder, computing a second partial remainder, adjusting the second partial quotient to generate an adjusted second partial quotient, and computing a quotient by adding the adjusted first partial quotient to the adjusted second partial quotient.

20. The computing device of claim 19, wherein the processing unit further performs the steps of testing for a divide by zero condition, modifying the quotient if a divide by zero is detected, and returning the modified quotient.

* * * * *